Figure 1:
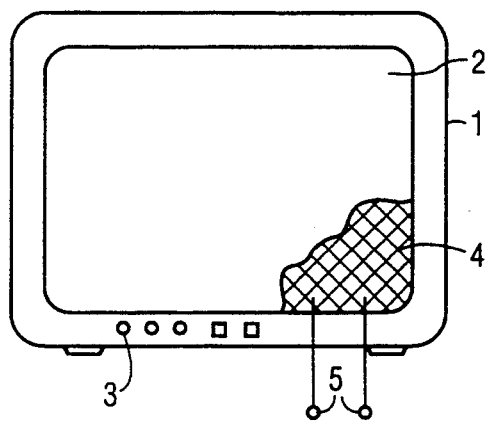

United States Patent [19]

Thiele

[11] Patent Number: 5,400,414
[45] Date of Patent: Mar. 21, 1995

[54] LOUDSPEAKER

[75] Inventor: Karl-Heinz A. A. O. Thiele, Peine, Germany

[73] Assignee: Electronic-Werke Deutschland GmbH, Villingen-Schwenningen, Germany

[21] Appl. No.: 678,351
[22] PCT Filed: Sep. 26, 1989
[86] PCT No.: PCT/EP89/01076
§ 371 Date: Feb. 14, 1992
§ 102(e) Date: Feb. 14, 1992
[87] PCT Pub. No.: WO90/03711
PCT Pub. Date: Apr. 5, 1990

[30] Foreign Application Priority Data

Sep. 26, 1988 [DE] Germany .......... 38 32 616.7
Sep. 26, 1988 [DE] Germany .......... 38 32 617.5
May 12, 1989 [DE] Germany .......... 39 15 626.5

[51] Int. Cl.[6] .................................. H04R 17/00
[52] U.S. Cl. .......................... 381/190; 381/24
[58] Field of Search ............ 381/24, 90, 188, 205, 381/190, 182

[56] References Cited

FOREIGN PATENT DOCUMENTS 61-61598  3/1986  Japan .
539845    9/1973  Switzerland .
2052919   1/1981  United Kingdom .
2081948   2/1982  United Kingdom .

Primary Examiner—Forester W. Isen
Attorney, Agent, or Firm—Joseph S. Tripoli; Peter M. Emanuel; Frederick A. Wein

[57] ABSTRACT

An electromechanical transducer made of a piezo-polymer film is presented. The film is transparent and is applied to a television screen, glass pane of a framed picture, or the like. The piezo-polymer film is arranged to provide a plurality of loudspeakers of a television apparatus which can be controlled by a digital audio signal.

7 Claims, 4 Drawing Sheets

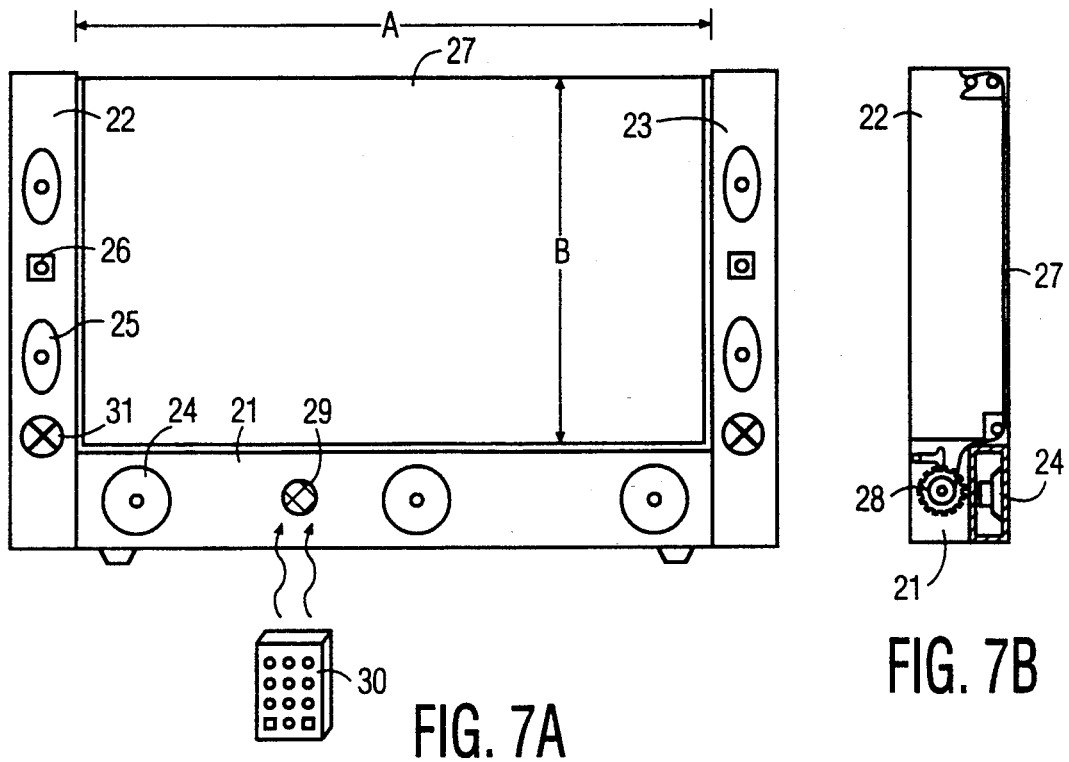
FIG. 7A
FIG. 7B
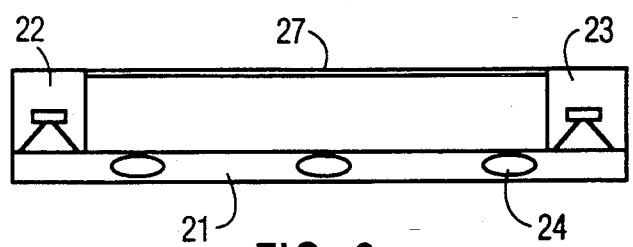
FIG. 8
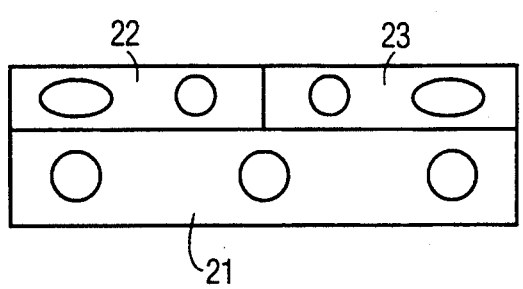
FIG. 9
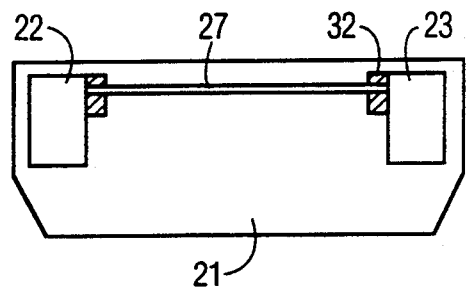
FIG. 10

LOUDSPEAKER

The invention is based on a picture/sound reproducing device comprising a picture screen and at least two loudspeakers in the form of elektro-magnetical converters.

The invention is based on the object to reach a conformity (matching) of the spatial position of the source of the picture and the source of sound with such a device.

This tast is solved by the invention given in the claim 1. Advantageous further developments of the invention are given in the subclaims.

With clocks and miniature radios it is known (GB A 2 052 919) to provide on a glass pane covering a clockface or scale a piezo-polymeric foil serving as loudspeaker. This is not, however, a picture/sound reproducing device with a picture screen with which one tries to achive a matching of the spatial position of picture source and sound source. Also, here on the glass pane it is not a case where there are several electromechanical converters arranged in the form of piezo-polymeric foils.

In the DE-A 32 23 615 another electro-mechanical converter in the form of a piezo-polymeric foil has been described. Here, a particularly suitable material is given for a transparent piezo-electrical plastic foil for an electro-mechanical converter. This converter, however, is not arranged in the form of a loudspeaker on the picture screen of a picture/sound reproducing device.

It is further known (Patent Abstracts of Japan, Volume 9, No. 43 (E-298)(1766) Feb. 33, 1985) to provide in the corners of the front face of a television receiver housing outside the visible picture area electro-magnetical vibrators which cause oscillations of the front pane in front of the picture tube in the sense of a loudspeaker. Hereby, however, the front pane is made of regular glass and is not designed as a piezo-polymeric foil. Rather, the front pane constitutes no active electro-mechanical converter but is only stimulated to oscillate for the purpose of sound reproduction by the vibrators provided outside the picture area.

With the invention extra space for the loudspeaker is no longer required at the housing of the television receiver so that new options arise for the design of a television receiver. An optimum matching of the spatial position of picture source and sound source is achieved because picture and sound exactly originate from the same surface, namely the picture screen of the television receiver. Such a loudspeaker with a piezo-polymeric foil bears the advantage, particularly with a television receiver, that it generates no magnetic field which could interfere with the deflection in the picture tube.

The invention is illustrated with reference to the drawing. Therein is shown

Figure 2:
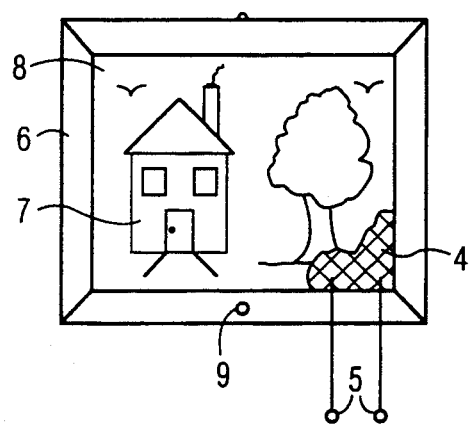
Figure 3:
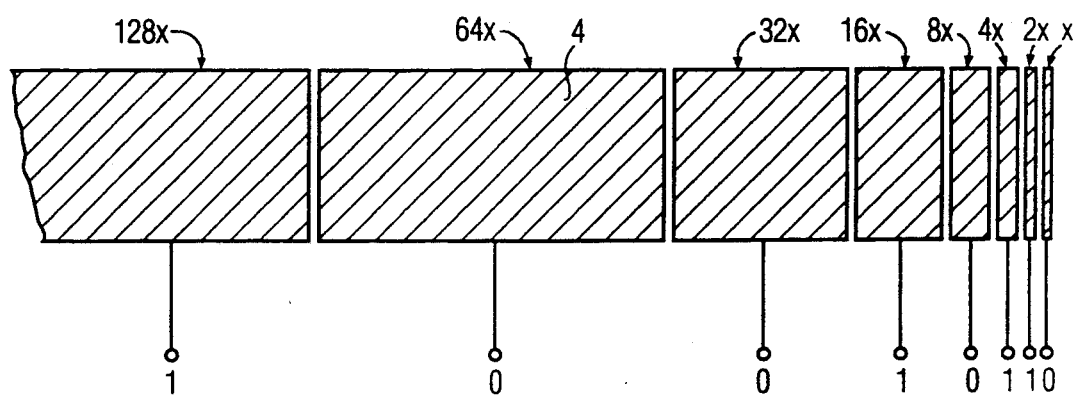
Figure 4:
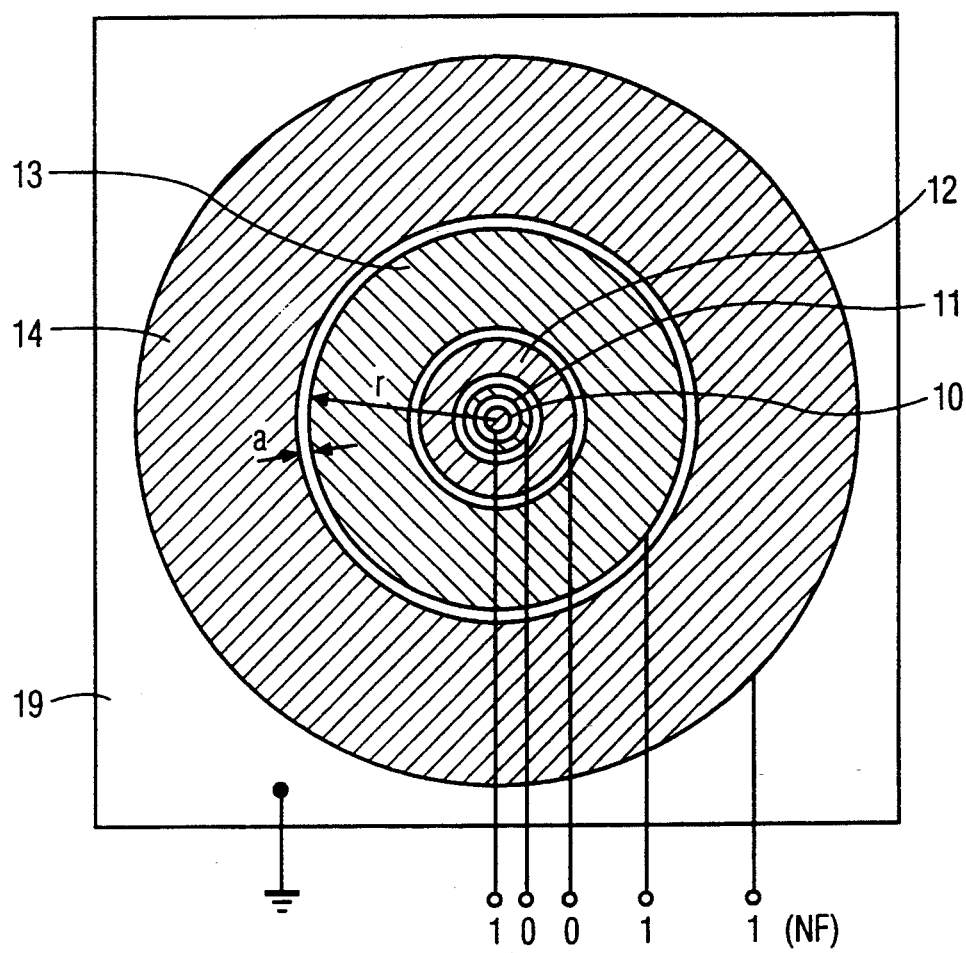
Figures 5, 6:
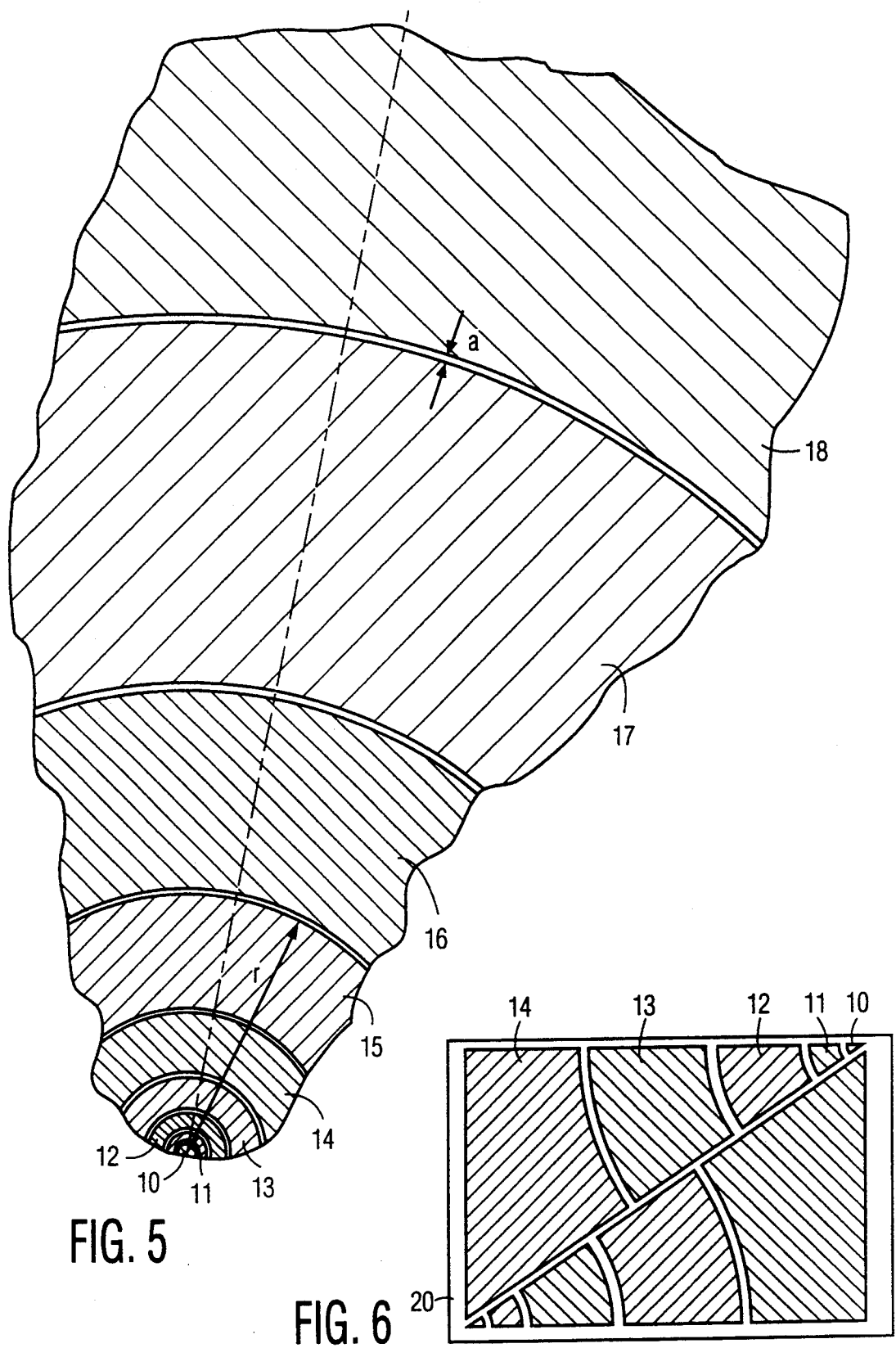

FIG. 1 an example of a television receiver,

FIG. 2 an example of a picture,

FIG. 3 a further development of the invention for a loudspeaker to be controlled by means of a digital audio signal, FIG. 4 a further development of FIG. 3 with ring-shaped foils, FIG. 5 a section of FIG. 4 with a surface ratio true to scale, FIG. 6 a further development of FIG. 5 for a television receiver, FIG. 7 a further embodiment example of the invention, and FIGS. 8–10 different views of FIG. 7.

FIG. 1 shows a television receiver 1 with the picture screen 2 and the operating elements 3. Affixed to the picture screen is the transparent piezo-polymeric foil 4, here represented in symbolic form by crosshatching, which cannot be seen in reality and which extends over the entire picture screen 2. The side of the foil 4 facing the picture screen 2 is connected with the ground potential of the television receiver. At two points, in particular outside the visible picture screen area the foil 4 is contacted. The thereby formed terminals 5 are being applied the audiofrequency ausio signal accompanying the picture reproduction. An additional loudspeaker at the left side, at the right side or below the picture screen 2 is no longer required.

FIG. 2 shows a picture with the frame 6, the forepart 7 itself of the picture and the glass pane 8 covering the forepart 7. Affixed onto the glass pane is the transparent piezo-polymeric foil 4 serving as loudspeaker which, like in FIG. 1, is controlled via the terminals 5 by means of an audiofrequency audio signal and serves as loudspeaker. A means of adjustment 9 for the volume of the sound field generated by foil 4 is also built into the frame 6.

FIG. 3 shows a further development for controlling the loudspeaker using a digital audio signal. The foil 4 is divided into a mutiplicity of individual foils whose surface ratios are graded in powers of two. Consequently, the surfaces of the individual partial foils exhibit values of x, 2x, 4x, 8x, 16x, 32x, 64x, 128x. The bits of different values of a digital signal are applied to the individual partial foils which form a loudspeaker each. Thus, the partial foils each generate a sound field in accordance with the digital signal. The listener perceives the sum of sound fields originating from the individual partial foils; this corresponds with the actual analog audio signal. Such a loudspeaker acts, so to speak, as a mechanical digital-to-analog converter.

FIG. 4 shows a further development in which the realization of foils with such differing surfaces is simplified. The individual foils are not lying side by side in rectangular shape but are designed as ring-shaped concentric foils 10, 11, 12, 13, 14 which are arranged on a mounting board 19 and have small gaps 'a' of about 1 mm each. Because the respective actual radius 'r' has a square-amount effect on the surface size the grading in surfaces according to FIG. 4 can be better realized. If 'n' is the ordinal of a foil and 'F' is the respective surface of the foil, then the relation $F_n = 2 \ast F_{n-1} = 2^{n-1} \ast F_1$ is valid for all cases. In FIG. 4 the shown surfaces are not to scale, thus, they do not fulfill the requirement of powers of two as demanded.

FIG. 5 shows a sector form section which is open at all sides from an arrangement according to FIG. 4 in which the surfaces of the individual foils 10 through 18 are represented to scale according to the powers of two.

For an example embodiment with eight ring-shaped concentric foils 10 through 17 for an eight bit digital audio signal the following values result for the ordinal 'n', the respective outside radius 'r' of a foil and the gap 'a' between two adjacent foils:

| n | r (mm) | r + a (mm) |
| --- | --- | --- |
| 1 | 2 | 3 |
| 2 | 6.02 | 7.02 |

-continued

| n | r (mm) | r + a (mm) |
|---|--------|------------|
| 3 | 13.07  | 14.07      |
| 4 | 25.57  | 26.57      |
| 5 | 47.77  | 48.77      |
| 6 | 87.18  | 88.18      |
| 7 | 157.11 | 158.11     |
| 8 | 281.18 | 282.18     |

In FIG. 6 the picture screen 20 of a television receiver is partitioned in two roughly triangular areas by means of a diagonal line. Each of the two triangular areas contains five segment form foils 10 through 14 according to FIG. 5. The two triangular arrangements which are similar to each other can then serve for the reproduction of a stereo audio signal.

In FIG. 7 two vertically standing parts of the housing 22, 23 having a clearance 'A' are arranged on a horizontally arranged pedestal 21. The pedestal 21 contains bass loudspeakers 24, whereas the housing parts 22, 23 contain broad band loudspeakers 25 and tweeters 26. In the opening formed by the parts 21, 22, 23 a projection screen 27 for the projection of a picture by a television projector is arranged. The projection screen can be lowered into (taken up by) the pedestal 21 by means of a take-up winding means 28. The pedestal 21 contains an infrared receiver 29 for the signals of a remote control unit 30 by which parameters of sound reproduction such as volume, treble, bass and stereo balance can be remotely controlled using active speakers. Furthermore, lamps 31 are provided in the pedestal 21 or the housing parts 22, 23 which can also be controlled in their brightness or switched on or off using the remote control unit 30.

FIGS. 8 is a top view of the arrangement according to FIG. 7. The projection screen 27 is firmly stretched between the housing parts 22, 23.

In FIG. 9 the pedestal 21 and the housing parts 22, 23 are folded to a compact unit whereby the screen 27 is taken up inside the pedestal 21.

FIG. 10 shows in a top view how the screen 27 is guided alongside the housing parts 22, 23 by means of guidances 32 in order that it forms as much as possible a flat level and does not permit waves for a flawless picture projection.

The housing parts 22, 23 can be designed to be fitted onto the pedestal 21 with differing clearances 'A' in order to allow the fitting of screens with differing aspect ratios A/B. Most importantly, the following values for the aspect ratio should be considered in practice:

| A/B   | Application                     |
|-------|---------------------------------|
| 4:3   | Television, 'Super-8' projection |
| 5:3   |                                 |
| 5:4   |                                 |
| 16:9  | HDTV projection                 |
| 36:24 | Slide projection                |

The projection screen 27 is equipped with a piezo-polymeric foil extending over the entire surface or a part of the surface or designed to be such a foil itself. Such a foil forms a membrane with a piezo-electrically controllable thickness and can additionally serve as loudspeaker, in particular as mid-range loudspeaker. The alterations in thickness of the foil on operation as loudspeaker membrane amount to only a few micrometers and have no adverse effect on the picture reproduction. Hereby, the foil is preferably split along a vertical line in the middle in two separate foils which form a loudspeaker each for a stereo audio reproduction. The foil serving as loudspeaker can also be located behind the projection screen 27 as seen from the viewer side. Further, it is possible to split the entire surface of the screen 27 into a larger number of separate piezo-polymeric foils which represent an electro-statical loudspeaker each for different frequency ranges or channels of a multiple-channel audio reproduction. This solution bears the advantage that the surface occupied by the screen 27 additionally serves as loudspeaker and the space otherwise required for mid-range loudspeakers is saved in the entire apparatus. If desired, the two housing pares 23 can be designed smaller, only serve as support for the screen 27 or be omitted entirely if the screen is designed to be self-supporting.

I claim:

1. A loudspeaker for a television display comprising:
 a transparent piezo-polymeric foil disposed on a television display device,
 a plurality of loudspeakers being formed on one foil, each of the loudspeakers having respective electrodes for electrical activation, each of the loudspeakers having a plurality of sections of different surface sizes, the surface sizes having relative surface areas according to progressive powers of two for providing a digital output according to the significance of the respective bits of a digital signal, the plurality of sections being arranged as concentric rings with gaps therebetween, with the annular widths of each ring increasing with increasing ring diameter.

2. A loudspeaker according to claim 1 wherein the foils are affixed to the picture screen of one of a television receiver, monitor, and a glass pane.

3. A loudspeaker according to claim 1 wherein the piezo-polymeric foils are affixed to a projection screen.

4. A loudspeaker according to claim 1 wherein a housing of the loudspeaker has two vertical housing parts arranged with a gap and standing on a pedestal between which a projection screen is arranged.

5. A loudspeaker according to claim 4, wherein the housing parts are designed to be foldable into a compact unit.

6. A loudspeaker according to claim 4, wherein receivers for signals from a remote control unit are disposed in boxes, by means of which parameters of sound reproduction can be adjusted remotely.

7. A loudspeaker according to claim 4, the projection screen contains said piezo-polymeric foil acting as loudspeaker.

* * * * *